United States Patent [19]
Gill et al.

[11] 3,722,718
[45] Mar. 27, 1973

[54] HYDRAULIC CONTROL SYSTEM FOR A SKIP HOIST

[76] Inventors: Joseph G. Gill, 6560 Wild Oaks Dr.; John H. Gill, 6540 Wild Oaks Dr., both of Sylvania Twp., Ohio 43615; Arthur J. Holmes, 5833 Winding Way, Sylvania, Ohio 43560

[22] Filed: May 4, 1971

[21] Appl. No.: 140,191

[52] U.S. Cl. .................214/100, 187/12, 187/27, 214/41, 214/107, 254/173 R
[51] Int. Cl. ..................................................B66b 5/24
[58] Field of Search ......214/100, 106, 107; 254/160, 254/173 R, 174, 175.7; 187/12, 13, 27, 28, 67

[56] References Cited

UNITED STATES PATENTS

| | | | |
|---|---|---|---|
| 3,322,289 | 5/1967 | Wendell et al. | 214/100 |
| 2,407,694 | 9/1946 | Vickers | 187/28 |
| 1,654,650 | 1/1928 | Hymans | 187/67 |
| 1,873,807 | 8/1932 | Arnold | 187/67 |
| 1,279,748 | 9/1918 | Newhouse | 214/107 |

Primary Examiner—Gerald M. Forlenza
Assistant Examiner—Lawrence J. Oresky
Attorney—Hugh Adam Kirk

[57] ABSTRACT

A reversible hydraulic motor for driving a windlass or winch for a cable connected to a skip and to cams that operate valves and switches for controlling said motor, including a hydraulic retarder for the motion of the skip in one direction that stores energy for later starting the skip in the opposite direction, and safety means in the hydraulic system for said motor to stop the motor and skip when the hydraulic pressure in said system goes either above or below predetermined limits.

The skip reciprocates along an inclined track between a loading and an unloading station, such as for hot asphalt between its mixing plant and its hot storage bin. The skip may have a bottom door that automatically opens at its unloading station. The track may have a lower section that is movable away from the loading station when the skip and hot asphalt storage bin are not being used.

15 Claims, 6 Drawing Figures

HYDRAULIC CONTROL SYSTEM FOR A SKIP HOIST

BACKGROUND OF THE INVENTION

Previously the skips which move up inclined planes between a lower loading station and an upper unloading or discharging station, particularly for storing hot asphalt from a mixing plant in a heated storage bin until it may be used, comprised electrically driven winches or hoists which were controlled by electrical means, either manually or automatically. If such systems had safety control devices they usually required additional mechanical means such as brakes on the skip and/or windlass for the skip which were controlled manually or automatically by over-speeding of the skip when descending its inclined track under its own weight or by gravity.

Furthermore these systems provided no means for storing the energy employed in deceleration to be used at a later time for accelerating the skip in the opposite direction when it reached one of its stations, such as the unloading station.

SUMMARY OF THE INVENTION

Generally speaking, the hydraulic skip hoist control system of this invention is adapted to a skip which reciprocates along an inclined track between a lower loading station and an upper unloading station. This skip usually has an open top and a normally closed openable bottom door or gate which may be automatically opened at the upper unloading station.

Since the skip hoist of this invention is particularly adapted for installation between an asphalt mixing plant and a hot asphalt storage bin, and since the discharge from the mixing plant is usually at an elevated level so that the plant may discharge directly into the top of a truck which may be backed under the discharge from the plant, the lower end of the rail system or track for the skip is adapted to be located also under the discharge of the mixing plant. Therefore, this invention also includes means for moving the lower portion of the track out of the way if necessary so that a truck can be used instead of the skip and storage of the hot asphalt is not desired. Such a track section movable means may comprise hinges for the rails or slides to move them laterally out of the way and piston motors for performing the operation.

The skip is moved up and down its inclined track by means of one or more cables attached thereto which pass over pulleys at the upper end of the track and thence downwardly to a windlass or winch that has one or more drums around which the cable or cables are wound. Instead of driving this drum or drums by an electric motor, a reversible hydraulic motor is employed so that the pressure in its hydraulic system may be maintained within predetermined limits both for pulling the skip up and letting the skip down under the force of gravity, and if this pressure goes beyond these limits the flow of fluid through the motor is automatically restricted to retard and even stop its rotation. This reversible hydraulic motor control system comprises besides its limiting pressure responsive devices, up and down valves, bypass valves, and one or more cam controlled valves for decelerating the movement of the skip as it approaches its station.

A hydraulic system is also provided for a bump cylinder, preferably at the upper station, which is actuated by the movement of the skip into that station to further slow down its motion, and the pressure produced thereby in the bump cylinder is used to pressurize an accumulator that, after a predetermined delay corresponding to the time necessary for discharging or unloading the skip, is employed to reverse the action of the bump cylinder and start the skip on its downward movement. This hydraulic system may be connected to the main hydraulic pressurizing pump and reservoir for hydraulic fluid which also supplies the hydraulic control system for the reversible hydraulic motor.

The control of the up and down valves for the reversible hydraulic motor system and for the timing of the release of the pressure in the accumulator may be by solenoid type valves in an electrical system which may be controlled either manually or automatically as desired, and may also control an electric motor which operates the pump to supply the pressure for both hydraulic systems. In addition, this electrical system may include up and down limit switches which may be operated by a mechanical controller connected to the reversible hydraulic motor and/or windlass drum, thereby eliminating the necessity of having limit switches along the skip's track.

Accordingly, it is an object and purpose of this invention to provide a control system built into the positive driving system for a skip hoist which is simple, effective, efficient, economic, safe, positive, and automatic in its control.

Another object is to provide such a system which may readily be adapted to presently employed systems and may be easily disconnected in part at its loading station so that a truck or other vehicle means may be directly loaded without interference by the track for the skip.

BRIEF DESCRIPTION OF THE VIEWS

The above mentioned and other features, objects, and advantages, and the manner of attaining them are described more specifically below by reference to embodiments of this invention shown in the accompanying drawings, wherein.

DETAILED DESCRIPTION OF PREFERRED EMBODIMENTS

I. The Skip and Track

Figure 1:
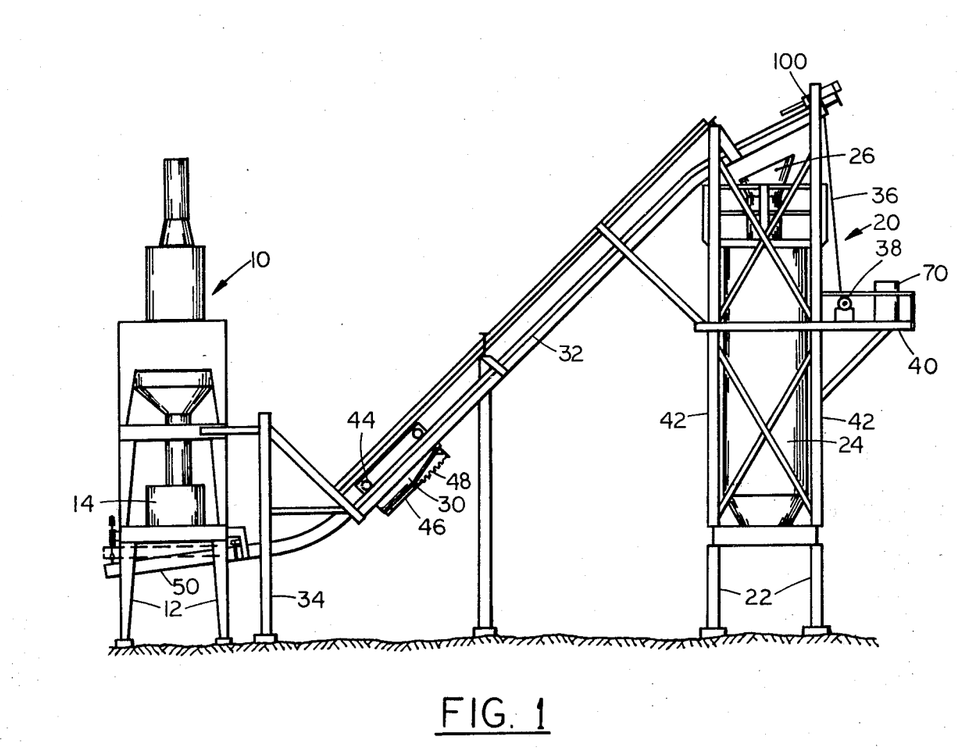
FIG. 1 is a side elevation of a skip and its track installed between the discharge of a hot asphalt mixing plant and the top of a hot asphalt storage bin, including a means for moving the lower portion of the track out of the way so that a truck may be moved under the discharge of the mixing plant.

Referring first to FIG. 1 there is shown a skip hoist and inclined track assembly according to one embodiment of this invention, connected between a hot asphalt mixing plant 10 and a hot asphalt storage bin or tank 20, each of which are shown supported above the ground on spaced legs 12 and 22, respectively, so that a truck may be driven under them between the legs for receiving the hot asphalt mix either directly from the plant 10 or from the hot storage bin 20.

The hot asphalt mixing plant 10 usually comprises a rotary drum type kiln in which sand and stone such as crushed limestone, are dried at a temperature of about 300° F. and then they are mixed with liquid asphalt in a mixer 14 from whence batches of mix may be dumped directly into a truck, or into a skip 30 and transported to the hot asphalt storage bin 20.

The hot storage bin 20 comprises a jacketed tank 24 in which the mix is agitated continuously and kept at a temperature of about 300° F. Then when the mix is to be used, it is emptied from the bottom of the tank 24 into a truck which is driven between the spaced legs 22.

The skip 30 reciprocates along an inclined track 32 which extends from a loading station under the mixer 14 between the legs 12 and thence outwardly and upwardly to an unloading station over an input hopper 26 above the storage tank 24. The skip 30 is moved along this track 32 by means of one or more cables 36 (see also FIG. 4) which wrap around one or more windlasses or hoisting drums 38 which are driven by a reversible hydraulic motor 60 under the control mechanism of this invention. These windlasses and their driving and control mechanism may be mounted on a platform 40 attached to one side of a frame 42 that supports the hot asphalt tank 24. This open top skip 30 is herein shown to be suspended between a pair of parallel rails that form the track 32 by means of wheels 44 on each side of the skip 30 that roll along these rails. The bottom of the skip may be provided with a slidable gate 46 which may be automatically opened against the action of tension springs 48 when a stop on the gate abuts a stop on the edge of the hopper 26. Then when the skip leaves its unloading station, the gate 46 is returned to its normally closed position again by means of the springs 48.

Figure 2:
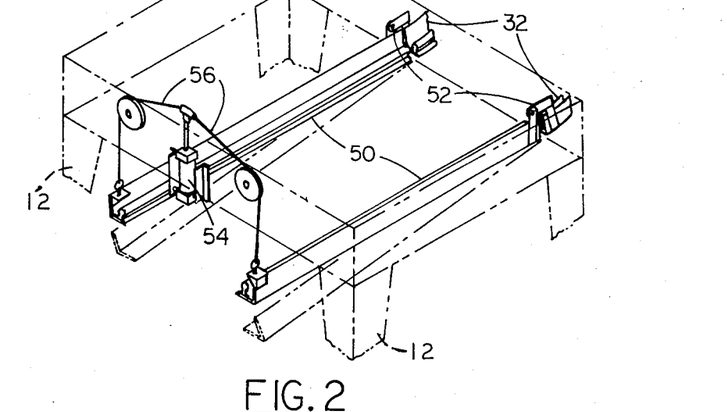
FIG. 2 is an enlarged perspective view of the embodiment of means for moving the lower portion or section of the track shown in FIG. 1, with the usable position of the track and the support for the mixing plant shown in dotted and dash lines.

The lower portion or section 50 of the track 32 which extends under the asphalt plant 10 and between the legs 12, may be hinged at 52 (see FIG. 2) to the lower ends of the rails forming the rest of the track 32, so that this section 50 may be moved upwardly, and out of the way of a truck. The means for moving this section 50 into its full line position shown in FIG. 2 may comprise a hydraulic piston motor 54 connected to cables 56 attached to the outer lower ends of the section 50. In this full line position the skip 30 is then not used, and should be parked elsewhere along the track 32, such as in the position shown in FIG. 1.

Figure 3:
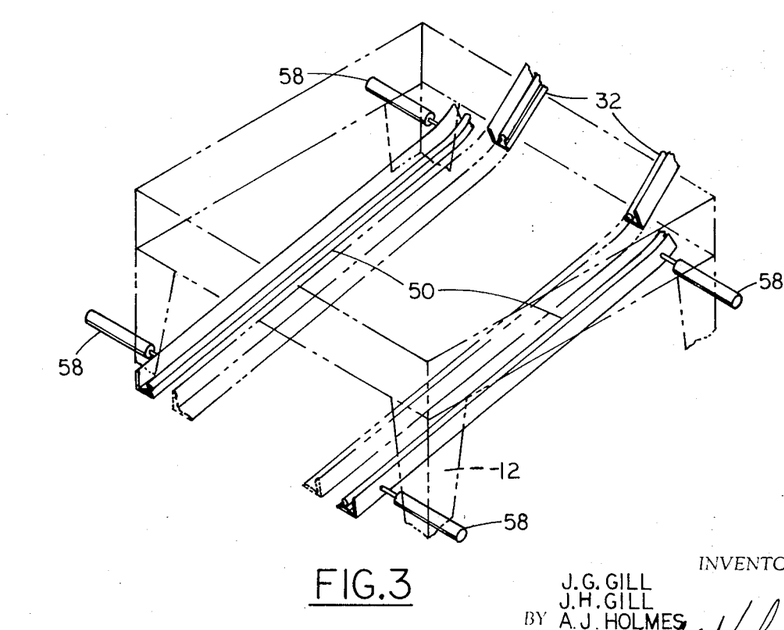
FIG. 3 is a perspective view similar to FIG. 2 but showing another embodiment of a means for moving the lower portion of the track out of the way.

Another embodiment of a means for moving the lower track section 50 is shown in FIG. 3, wherein each of the two rails of this section is connected to a pair of hydraulic piston motors 58 adjacent each leg 12, which motors 58 spread the rails so that a truck can be moved in between them.

II. Control Systems for the Skip a. The Hydraulic Systems

Figure 4:
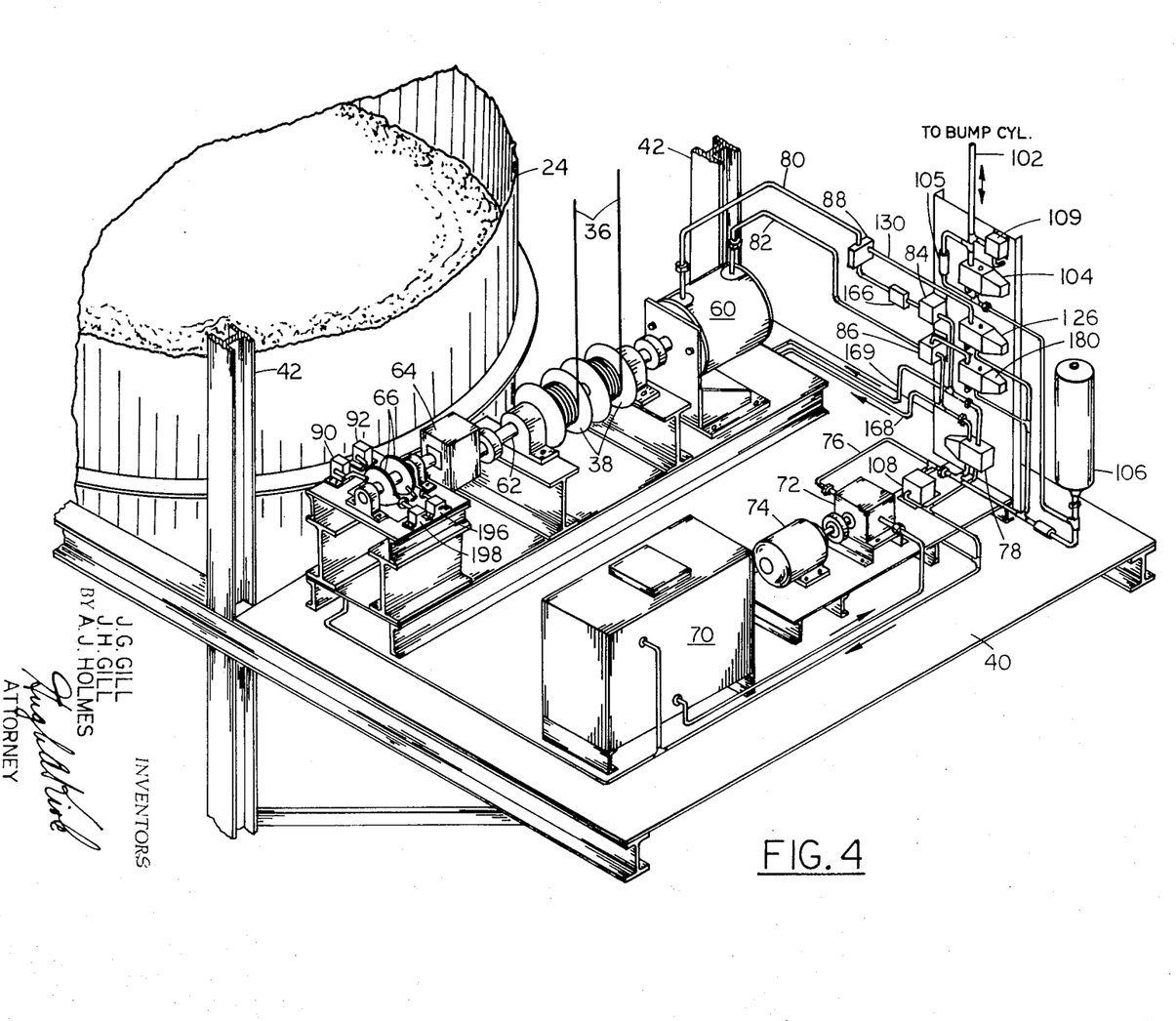
FIG. 4 is an enlarged perspective view of the hydraulic systems of this invention mounted on the platform on the left side of the hot asphalt storage tank shown in FIG. 1, including the reversible hydraulic motor, two windlass drums for cables for the skip, gear reduction mechanism for operating deceleration cams and limit switches, an accumulator, associated valves, and an electric motor driven pump and reservoir for supplying the hydraulic liquid for the systems.

In FIG. 4 on platform 40, the windlasses or drums 38 are directly connected to the reversible hydraulic motor 60 by a common shaft 62, which shaft 62 also operates a reduction gear device 64 for rotating a pair of cams 66 that control deceleration valve and limit switches for the movement of the skip 30.

Also mounted on the platform 40 is a reservoir 70 from which hydraulic fluid is supplied to a pump 72 driven by an electric motor 74, which pump 72 supplies this hydraulic fluid under substantially constant pressure through duct 76 to the hydraulic control systems for the skip.

The hydraulic control system for the reversible hydraulic motor 60 comprises a solenoid controlled up valve 78 connecting ducts 80 and 82, each containing bypass valve means 84 and 86, respectively, to the opposite sides of the reversible hydraulic motor 60. In one of these ducts 80 there is provided a safety valve device 88 which operates to shut off the system and prevent flow of hydraulic fluid through the motor 60 when the pressure in the supply duct 76 from the pump 72 falls below a predetermined amount (see also FIG. 6). The operation of these means 84 and 86 and device 88 and their controls will be described in more detail in the next section in connection with FIGS. 5 and 6. Also connected into this hydraulic motor control system are a pair of deceleration valves 90 and 92 operated by the cams 66, which valves automatically vary the pressure in the ducts 80 and 82 flowing to the reversible motor 60 when the skip reaches either its upper or lower terminus.

An additional feature of the control system of this invention for the skip 30 comprises, at its upper terminus or unloading station, one or more hydraulic piston or bump cylinders 100 (see FIGS. 1 and 6) which compress hydraulic fluid by the motion of the skip as it decelerates into this station. This compressed fluid is then passed through the duct 102, around a solenoid kick valve 104 and through a check valve 105 to pressurize an accumulator 106 (see FIGS. 4 and 6). This check valve 105 closes when the skip stops so as to retain the pressure accumulated in the accumulator 106 and then after a sufficient length of time for the skip to dump, the kick valve 104 is opened so that the pressure in the accumulator 106 can then activate the cylinders 100 to start the skip on its downward travel from the unloading position.

Each of the two hydraulic systems are provided with pressure relief valves such as 108 and 109 (see FIGS. 4 and 6) to prevent over pressurization of the direct motor 60 control system and the accumulator 106 pressure system, respectively. Each of these pressure relief valves 108 and 109 are also connected to the reservoir 70 for dumping any excess fluid that operates them.

II - b. Electrical System and Operation

Before the hydraulic systems of this invention can be started the electric motor for pressurizing the fluid for them and the hot batch bin agitator must be energized and remain energized as long as any asphalt remains in the storage bin 20. Accordingly reference is now had to the electrical wiring diagram of FIG. 5 in which a 120-volt control circuit is taken from transformer 110 and connected via master On-Off switch 112 and a fuse 114 to Stop and Start switches 116 and 118, respectively, the former of which is normally closed and the latter of which is normally open. When the master switch 112 is closed then the Start switch 118 can be operated to energize the storage agitator motor relay M 1, which relay starts the motor for driving the agitator in the tank 24. Simultaneously, with the energization of the relay M 1, a pilot light 120 is lighted and the hydraulic pump relay M 2 is energized, which starts the motor 74 that runs the pump 72 that pressurizes the hydraulic systems shown in FIGS. 4 and 6.

Furthermore and simultaneously herewith, a safety valve relay 122 is energized (see also FIG. 6) which passes pressure from the pump 72 through ducts 76 and 124 through valve 126 operated by solenoid 122, and thence through duct 130 to operate the safety device 88. This safety device 88 herein may comprise a check valve 132 which is maintained open by a hydraulic cylinder 134 as long as sufficient pressure is maintained in this hydraulic system to overcome the natural spring pressure which otherwise would close the check valve 132. Thus this valve 132 is maintained open so that fluid may pass freely through the reversible hydraulic pump 60 to operate the same in either direction and move the skip, but when the pressure in the system is reduced below a certain limit, this valve 132 closes blocking any flow through the reversible motor 60 and thus stopping the skip 30 by preventing rotation of the drums 38.

Since the start switch 118 is momentarily energized, the storage motor relay M 1 through its contact m 1 acts as a holding circuit around the switch 118 to maintain the relays M 1, M 2, and the safety valve relay 122 energized continuously as indicated by the pilot light 120 until the whole system, including the hot batch storage bin 20 has been emptied and closed down.

Also connected through this holding contact m 1 is the complete electrical control circuit for controlling the hydraulic systems for the up and down movement of the skip. This circuit may be operated either manually or automatically, depending upon which one of two contacts "JOG" or "AUTO" are connected by the manual switch 140 shown in FIG. 5.

II - b - 1 Manual Operation

First let us assume that this manual switch 140 is in the position to connect its "JOG" contact, then the skip 30 can only be operated up or down as long as an up-jog switch 142 or a down-jog switch 144, respectively, is held operative. For example, if the skip 30 is under the asphalt mixing plant 10 and has just been filled with hot asphalt which is ready to be stored in the hot storage plant or bin 20, under manual operation the operator then depress the up-jog contact switch 142 so that a circuit is completed through the contact 140, the normally closed down-jog switch 144, and thence through a conductor 146 to energize an up valve relay 150 and light its pilot light 152 connected in parallel therewith. Energization of this up valve relay 150 operates the valve 78 into the other position than that shown in full lines in FIG. 6, so that pressure from the pump 72 is transferred through duct 76 up through duct 153 around normally closed valve 154 and through check valve 156 of means 84, through duct 80, and check valve 132 of safety device 88 to the hydraulic motor 60 to drive the windlasses 38 and raise the skip 30. The flow from the motor 60 is then through duct 82 and pressure operated valve 158 of means 86 which has been energized from the pressure in duct 152 through branch duct 160, in that this direction of fluid flow cannot pass through the check valve 162. From thence the fluid passing through the valve 158 passes through duct 164 and valve 78 back to the reservoir 70. This reservoir 70 is shown schematically at several different locations throughout the fluid diagram in FIG. 6 in order to simplify it and reduce the number of return ducts thereto.

There also may be provided in either the duct 80 or 82 a flow control valve 166 to further insure an optimum speed for the motor 60 regardless of the direction of flow of liquid through it. This valve 166 may be variable or preset, as desired.

As the skip 30 continues to move in its upward direction as the manually controlled up-jog valve 142 is held, and it approaches its unloading station, the cam 66 starts to operate the deceleration valve 90 so that it gradually opens, relieving more and more pressure in the duct 152 from the up control valve 78 by gradually bypassing it through the duct 168 and the valve 90 to reduce the speed of the skip 30 until it finally is stopped.

In addition to this deceleration valve 90, there is also provided, as previously stated, a pair of cushion, shock absorbers or bump cylinders 100 which cause fluid pressure created in these cylinders 100 by the skip 30 contacting them, which pressure passes through the duct 102, check valve 105, and thence duct 170 into the accumulator 106 for restarting the skip as described later.

As soon as the skip 30 appears to be stopped, the operator may remove his finger from the up-jog button 142 and the skip 30 will remain stationary until the operator operates the down-jog button 144. This causes current to flow through up-jog switch 142 and conductor 172 to operate simultaneously the down valve relay 174 and the kick valve relay 176 and parallel therewith pilot light 178. Operation of the down valve relay 174 operates the down control valve 180 which applies pressure from conductor 124 through conductor 182 to operate the normally closed valve 154. Since up valve relay 150 is not now energized, the pressurized fluid in duct 76 from the pump 72 flows through conductor 164 and around the now closed valve 158 via check valve 162 into duct 82 to reverse the direction of the rotation of the motor 60. Thence the fluid flows through normally open safety valve 132 and flow control valves 166 back through duct 80 and now open valve 154 and duct 152 to the reservoir 70. The deceleration of the skip may also be controlled as it nears its lower position or loading station by relieving the pressure from pump 72 in duct 164 by the gradual opening of the cam 66 operated valve 92 in bleed-off duct 169. Thus there is a positive control of the downward movement of the skip 30 also, which prevents over-speeding of the windlas 38 and motor 60.

Simultaneously with the energization of the down valve relay 174 it was previously said that the kick valve relay 176 is operated to operate the valve 104 so that the pressure accumulated in the accumulator 106 is released through duct 184 and back through conductor 102 to the cylinders 100 immediately to push start the skip 30 in its reverse or downward direction away from the unloading station at the top of the hot storage bin 20.

II - b - 2 Automatic Operation

Figure 5:
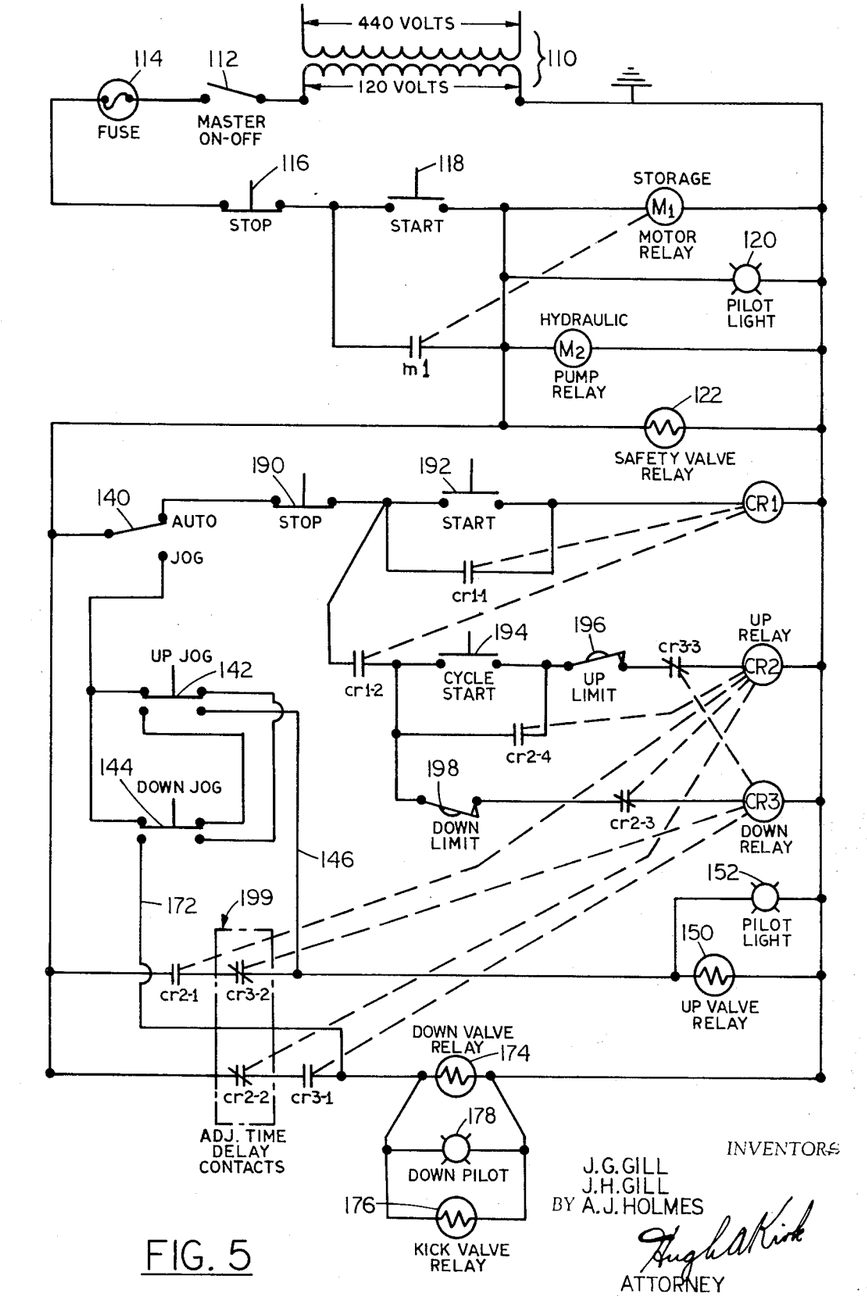
FIG. 5 is a schematic electrical wiring diagram of a control circuit for the electric motors, relays and solenoids which control the valves of the hydraulic systems.

If the system is to be placed in automatic operation, the switch 140 shown in FIG. 5 is left in the full line position shown against its "AUTO" contact, and the start button 192 of the Start-Stop switch 190, 192 must be momentarily pushed. This energizes the relay CR 1 which closes its holding contacts $cr\ 1 - 1$ around start switch 192 and closes its other contacts $cr\ 1 - 2$ to connect the cycle-start switch 194 into the circuit. In order to start one up and down cycle of the skip 30 from its lower position or loading station under the batch mixing plant 10, this cycle-start switch 194 is momentarily closed or pushed. This completes a circuit through the normally closed up-limit switch 196 and normally closed contacts $cr\ 3 - 3$ to energize the up-relay CR2 which immediately closes its holding contacts $cr\ 2 - 4$ and contacts $2 - 1$ to energize the up valve relay 150, and opens its contacts $cr\ 2 - 2$ and $cr\ 2 - 3$ to open the circuits to the down relay CR 3 and the down and kick valve relays 174 and 176 to prevent their operation. The energization of up valve relay 150 operates the up valve 78 in FIG. 6 to start the skip 30 up its track, which skip is later decelerated by valve 90 as described above for the manual operation of the skip 30. However, the controller for the cams 66 is also provided with up and down limit switches 196 and 198 (see also FIG. 4) so that as soon as the skip 30 is at its unloading station, the up limit switch 196 opens and relay CR 2 is de-energized. This causes the down relay CR 3 to be energized since the down limit switch 198 is closed and contacts $cr\ 2 - 3$ have just been closed. Nevertheless the down and kick valve relays 174 and 176 are not yet energized because contacts $cr\ 2 - 2$ (as are contacts $cr\ 3 - 2$) are delayed in closing being part of an adjustable time delay device 199, so that sufficient time is allowed for the skip 30 to empty its contents before being returned to its loading station. Down relay CR 3 does however open its contacts $cr\ 3 - 3$ to prevent operation of the up relay CR 2 and closes its contacts $cr\ 3 - 1$ so that the down and kick valve relays will be energized as soon as the time delay for closing contacts $cr\ 2 - 2$ expires. Then as soon as these down and kick valve relays 174 and 176 are energized, the remainder of the circuit operates as previously described in the manual operation above, including the operation of the accumulator 106 and bump cylinders 100 to start the skip 30 in its downward direction, as well as its deceleration by the cam 66 operation of decelerating valve 92. When the skip 30 is at its loading station again, the down limit switch 198 is opened, which deenergizes the down relay CR 3 to correspondingly open its contacts $cr\ 3 - 1$ and close its contacts $cr\ 3 - 2$ and $cr\ 3 - 3$ to prepare the circuit for the next cycle of operation, which cannot start until the cycle start button 194 is again operated.

Figure 6:
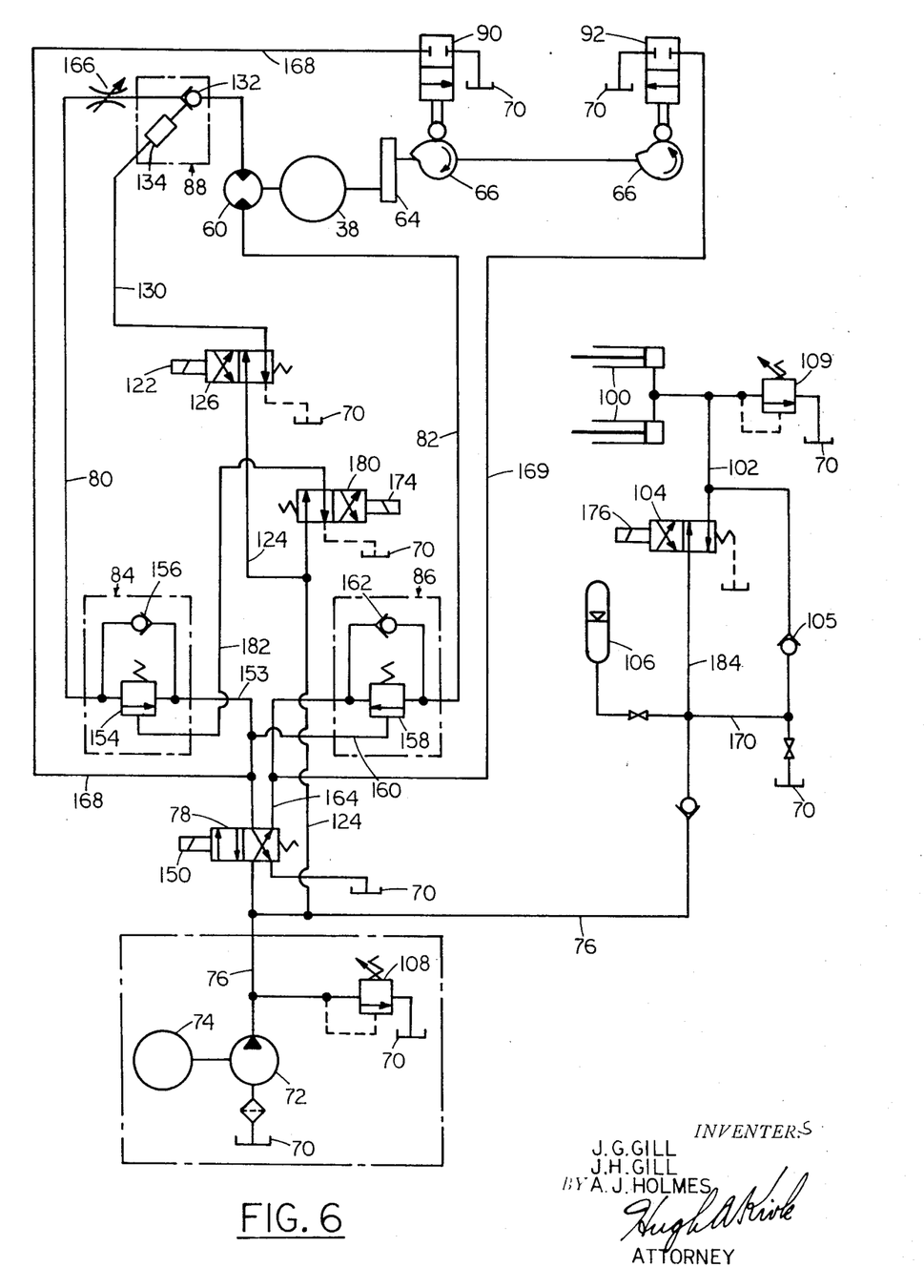
FIG. 6 is a schematic diagram of flow and valves in the hydraulic control systems shown in FIG. 4, including the solenoid operated valves controlled by the electrical circuit of FIG. 5.

Although all the ducts as shown in the diagram of FIG. 6 have not all been shown in the perspective view of the hydraulic systems in FIG. 4, it is to be clearly understood that these ducts have been omitted only for the purposes of clarity and can readily be installed from what is shown in the circuit of FIG. 6.

It is to be clearly understood that the up and down limit switches 196 and 198 instead of being placed on the controller shown on the platform 40 may also be placed along a track 32, however, the compaction of the present circuit is believed to have material advantages thereover.

While there is described above the principles of this invention in connection with specific apparatus, it is to be clearly understood that this description is made only by way of example and not as a limitation of the scope of this invention.

We claim:

1. A skip hoist comprising:
   a. an inclined track between a lower loading and an upper unloading station,
   b. hydraulic means for moving the lower section of said track relative to the rest of said track,
   c. a skip reciprocable on said track between said stations,
   d. a reversible hydraulic motor driven drum and cable hoist for said skip, and
   e. a control mechanism for said skip hoist comprising:
      1. an electrically controlled up and down valve means for controlling said hoist motor,
      2. cam means connected to said hoist drive for controlling the deceleration of said skip at at least one of said stations,
      3. a pressure responsive safety means in the hydraulic circuit of the hoist motor to stop said motor when the pressure in said circuit goes outside a predetermined range, and
      4. limit switches connected to said hoist drive for stopping said skip at said stations.

2. A skip hoist according to claim 1 wherein said lower section includes hinges between said lower section and the rest of said track, and said hydraulic means moves said lower section around the pivots of said hinges.

3. A skip hoist according to claim 1 wherein said hydraulic means moves said lower section tranversely to the rest of said track.

4. A skip hoist according to claim 1 wherein said skip has an open top and an openable bottom, and means at said unloading station for automatically opening said bottom.

5. In a skip hoist having:
   a. an inclined track between a lower loading and an upper unloading station,
   b. a skip reciprocable on said track between said stations, and
   c. a reversible hydraulic motor driven drum and cable hoist for said skip, the improvement comprising a control mechanism for said skip hoist comprising:

d. an electrically controlled up and down valve means for controlling said hoist motor,
e. hydraulic cushion-accumulator means operated by said skip at at least one of said stations for decelerating said skip and storing the energy of deceleration, and
f. an electric control means for simultaneously operating one of said valve means and for releasing the energy stored in said accumulator means for starting said skip on its return path on said track.

6. A skip hoist according to claim 5 including limit switches connected to said hoist drive for stopping the skip at said stations.

7. A skip hoist according to claim 6 wherein said limit switches control the circuit that operates said up and down valve means.

8. A skip hoist according to claim 4 including cam means connected to said hoist drive for controlling the deceleration of said skip at at least one of said stations.

9. A skip hoist according to claim 8 wherein said cam means includes and operates hydraulic valves in the circuit connected to said hoist motor.

10. A skip hoist according to claim 5 including a pressure responsive safety means in the hydraulic circuit of said hoist motor to stop said motor when the pressure in said circuit goes outside a predetermined range.

11. A skip hoist according to claim 10 wherein said safety means comprises a check valve and means for holding it open by the normal pressure in the hydraulic circuit for operating said hoist motor.

12. A skip hoist according to claim 10 wherein said safety means includes pressure operated valves operated by the pressure in the hydraulic circuit of said hoist motor.

13. A skip hoist according to claim 5 wherein said cushion accumulator means is located at the upper unloading station.

14. A skip hoist according to claim 5 wherein said electric control means includes a timing means for delaying the simultaneous operation of said one of said valve means and said releasing of said energy from said accumulator.

15. In a skip hoist having:
a. an inclined track between a lower leading and an upper unloading station,
b. a skip reciprocable on said track between said stations, and
c. a reversible hydraulic motor driven drum and cable hoist for said skip, the improvement comprising an automatic control mechanism for said skip hoist comprising:
d. an electrically controlled up and down valve means for controlling said hoist motor,
e. cam means connected to said hoist drive for controlling the deceleration of said skip at at least one of said stations,
f. a pressure responsive safety means in the hydraulic circuit of the hoist motor to stop said motor when the pressure in said circuit goes outside a predetermined range,
g. limit switches connected to said hoist drive for stopping said skip at said stations,
h. hydraulic cushion accumulator means operated by said skip at at least one of said stations for decelerating said skip and storing the energy of deceleration, and
i. an electric control means for delaying said starting of said skip by simultaneously controlling the operation of one of said valve means and the release of the energy stored in said accumulator means for starting said skip on its return path on said track.

* * * * *